(12) United States Patent
Phipps et al.

(10) Patent No.: US 7,591,320 B2
(45) Date of Patent: Sep. 22, 2009

(54) METHOD OF CEMENTING EXPANDABLE WELL TUBING

(75) Inventors: Jonathan Phipps, Lower Cambourne (GB); Jean Desroches, Paris (FR); Simon James, Le Plessis-Robinson (FR); Dominique Guillot, Somerville, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/667,416

(22) PCT Filed: Nov. 8, 2005

(86) PCT No.: PCT/GB2005/004308

§ 371 (c)(1),
(2), (4) Date: Oct. 24, 2007

(87) PCT Pub. No.: WO2006/051282

PCT Pub. Date: May 18, 2006

(65) Prior Publication Data

US 2008/0105429 A1     May 8, 2008

(30) Foreign Application Priority Data

Nov. 9, 2004    (GB) ................... 0424712.8

(51) Int. Cl.
*E21B 33/14* (2006.01)
*E21B 43/10* (2006.01)

(52) U.S. Cl. .............. 166/384; 166/207; 166/294; 166/387

(58) Field of Classification Search .................. None
See application file for complete search history.

(56) References Cited

U.S. PATENT DOCUMENTS

| 6,431,282 B1 | 8/2002 | Bosma et al. |
| 2003/0234102 A1 | 12/2003 | Brothers et al. |
| 2004/0149431 A1 | 8/2004 | Wylie et al. |
| 2004/0167248 A1 | 8/2004 | Brothers et al. |

FOREIGN PATENT DOCUMENTS

| WO | WO 03/048514 A1 | 6/2003 |
| WO | WO 2005/073504 A1 | 8/2005 |
| WO | WO 2006/045997 A1 | 5/2006 |

*Primary Examiner*—Zakiya W. Bates
(74) *Attorney, Agent, or Firm*—Steven Gahlings; Michael Ford; James McAleenan

(57) ABSTRACT

The invention describes a method of lining a well using expandable tubing including the steps of lowering a expandable tubing in a well bore; injecting a sealant composition into said well; letting the sealant composition solidify into a deformable matrix embedding at least a bottom section of said tubing within said well; and expanding the tubing. The invention allows the creation of a high quality seal at the shoe of the expandable casing because the deformable material is highly stressed by the expansion, and it also allows for the rest of the casing to be properly supported and protected by conventional cement, without incurring excessive wait-on-cement times.

12 Claims, 5 Drawing Sheets

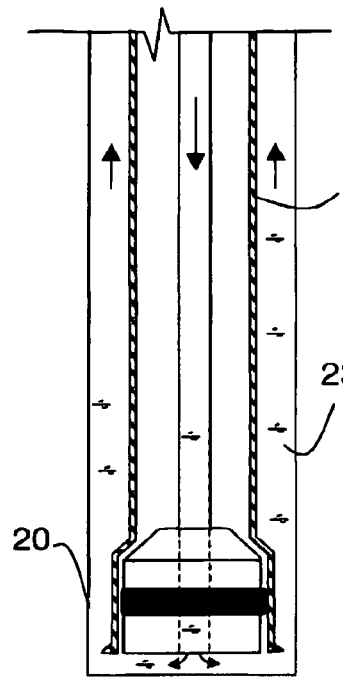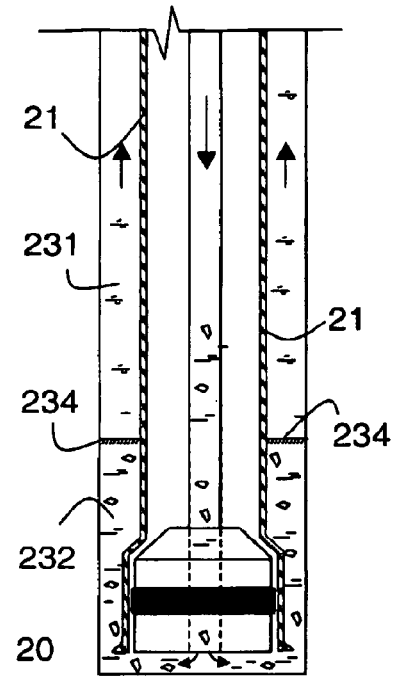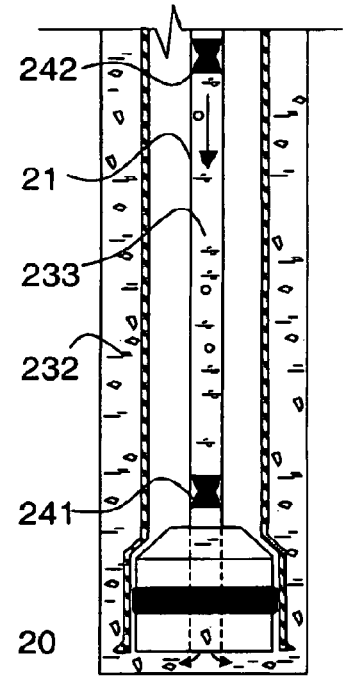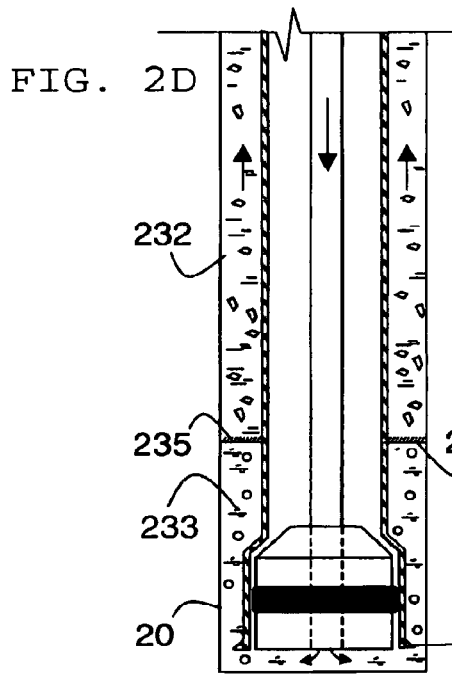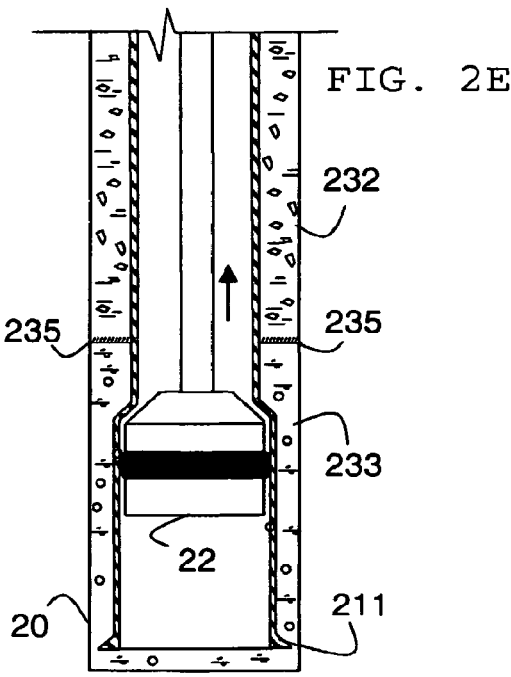

FIG. 3A
FIG. 3B
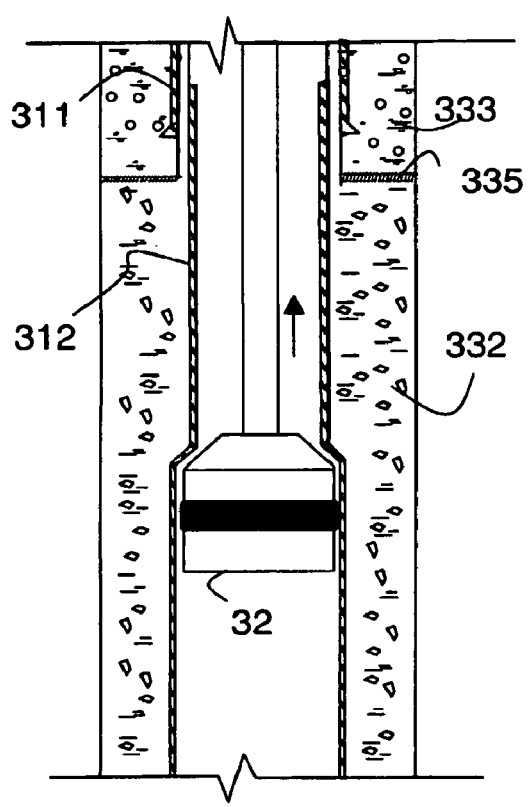
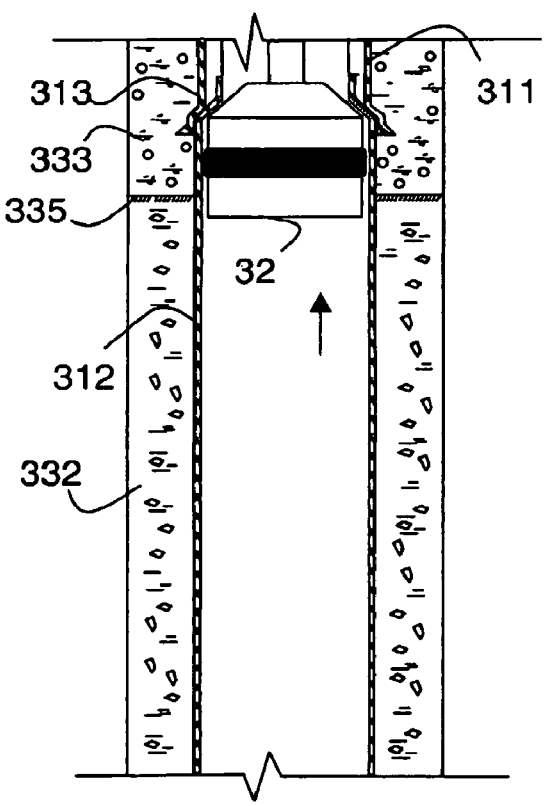

METHOD OF CEMENTING EXPANDABLE WELL TUBING

CROSS-REFERENCE TO RELATED APPLICATIONS

This application claims the benefits of priority from:
i) Application Number 0424712.8, entitled "METHOD OF CEMENTING EXPANDABLE TUBULARS," filed in the United Kingdom on Nov. 9, 2004; and
ii) Application Number PCT/GB2005/004308, entitled "METHOD OF CEMENTING EXPANDABLE WELL TUBING," filed under the PCT on Nov. 8, 2005;

All of which are commonly assigned to assignee of the present invention and hereby incorporated by reference in their entirety.

The invention describes a method for cementing expandable tubing, particularly wellbore tubing in the exploration and production of hydrocarbon reservoirs.

BACKGROUND OF THE INVENTION

Conventional oil and gas wells have to be drilled in multiple sections in order to ensure that the hydrostatic pressure in the section being drilled lies between the pore and fracture pressures of the surrounding formations. After drilling each section a casing is lowered into place and the annulus between casing and rock is filled with cement. Once set, the cement provides support and protection for the casing and should also provide a seal to prevent fluid communication between the formations through which the well has been drilled. However, cement often does not produce a reliable seal because it is a rigid and brittle material and because standard placement techniques do not provide a mechanism whereby it can be set into a suitable state of stress.

Conventionally, each subsequent section of the well has to be drilled at a smaller diameter in order to allow for its casing to be lowered down through the previous one, so that for very deep wells the reservoir can only be reached with a narrow diameter casing. Recently, expandable casings have been introduced into the market. These are lowered into the well and then expanded in situ to a larger diameter. Using this technology the reduction in diameter with each successive section is reduced, and they can potentially be used to construct a well of constant diameter along its whole depth.

The use of solid expandable tubing in the oil and gas industry is becoming increasingly common. They offer the potential to drill deep wells of significantly larger diameter at the reservoir than can be done with conventional casings.

Expandable tubing pose new challenges for cementing. After expansion, the annulus between the tubing and the borehole is very narrow, which makes it very difficult to achieve satisfactory mud displacement if cement is pumped at this stage. Therefore the cement is normally placed prior to expansion; this means that the expansion must be carried out after placement but before the cement has set, otherwise the rigid set cement will either be crushed by the expansion (potentially fracturing the surrounding rock) or will prevent expansion altogether. The cement must therefore have an unusually long thickening time, as extra time must be allowed to carry out the expansion. It is common practice to cement only the lower portion of each section in this way; if the whole annulus is cemented then an even longer thickening time is required, and this leads to excessively long wait-on-cement times in order to operate in a safe window. However, cementing only the lower section of the casing carries risks also, since it leaves the bulk of the casing unsupported and unprotected against corrosion by formation fluids, and reduces the probability of achieving zonal isolation.

In U.S. Pat. No. 6,431,282, it is proposed to use an elastomeric cladding around the expandable tubing. The elastomeric layer is wrapped around the tubing prior to deployment, and makes a seal with the wellbore wall after expansion. The majority of the radial expansion of the tubing is needed to bring the cladding into contact with the wellbore wall, but if the expansion is large enough the layer may be compressed against the wellbore wall which enhances its sealing ability. In order for this compression to occur, the elastomeric cladding must have sufficient bulk compressibility. Furthermore, since the cladding increases the external diameter of the tubing prior to expansion, it restricts the size of tubing that can be successfully deployed through the previous casing and thus compromises one of the main advantages of the expandable technology. For out of gauge or non-circular wellbores, it is proposed that the cladding should be made from a thermoplastic material which, when heated, will be able to flow sufficiently to fill up all of the annular space. However, this will result at best in the loss of compression of the cladding, and it is not explained how the existing fluid in the wellbore will be displaced by this process.

As an alternative to the external claddings on the casing, the use of in-situ vulcanisable elastomers is suggested in U.S. Pat. No. 6,431,282. Vulcanisable elastomers such as silicones could be pumped into the annulus as fluids and then allowed to set. In one embodiment the expansion occurs prior to the setting of the elastomer, in which case the expansion does not result in the stressing of the material which is necessary to provide a good seal. In another embodiment the tubing is allowed to 'dip in' to the unset elastomer, after which the elastomer is set and the tubing expanded. In each case it is not specified whether the elastomer should fill the annulus along the entire length of the tubing or just at its shoe. The filling of the entire annulus with such a material is likely to be prohibitively expensive, but the filling of the annulus only in the region of the shoe leaves the rest of the tubing unsupported and vulnerable to corrosion as described previously.

In the recent application US 2003/0234102, there is proposed the use of a compressible cement-based sealant. This is comprised of cement and an aqueous rubber latex suspension and is foamed by the addition of gas to render it sufficiently compressible. In order to make the material sufficiently deformable to allow for the compression the quantity of latex is more than double that of the cement, which results in a very weak product which is likely to be considerably more permeable than conventional cement both as a result of the foam and the low solid volume fraction of the fluid itself. This material could potentially be used to cement the whole length of the annulus, but given its very large proportion of latex this is also likely to be prohibitively expensive.

SUMMARY OF THE INVENTION

According to an aspect of the invention, a method is provided of lining a well using expandable tubing including the steps of lowering a expandable tubing in a well bore; injecting a sealant composition into said well; letting the sealant composition solidify into a deformable matrix embedding at least a bottom section of said tubing within said well; and expanding the tubing.

The well is preferable a borehole in subterranean formations. The step of placing the sealant composition aims at providing a fluid-tight seal around the casing shoe at the bottom of casing after the setting. Through the expansion of the tubing the sealant composition can then be deformed or compressed to engage tightly with the wall of the borehole and the casing. The sealant may either be compressed directly against the borehole wall, or alternatively a lower compressibility sealant may be stretched in axial direction of the well bore by the expansion of the tubing.

The method is preferably applied as a sub-operation within the cementing of a casing string in a section of the well. As such the injection of the sealant is preferably preceded by a step of injecting a cement composition. The sealant is pumped as a fluid directly after the cement, and sets quickly to a deformable material. It is advantageous to select the setting time of the cement composition to be substantially longer than the setting time of the sealant composition. Thus the sealant has already formed a solid matrix around the casing shoe before the expansion of the tubing starts, while the cement can still be squeezed by the expanding tubing. Then the sealant can provide a reliable seal in a suitable stress state at the shoe of the casing, and a complete cement matrix can be placed throughout the rest of the well annulus.

The casing expansion process offers a method by which a deformable sealant material can be put into a state of compressive stress. In a preferred method this invention provides a sealant composition which includes microspheres or gas-producing blowing agents. If, for example the expansion of the tubing is substantially greater than that which would be required to bring the cladding into contact with the wellbore wall additives such as malleable microspheres can be used to increase the compressability.

Many liquid elastomer precursors could potentially be used as sealant fluid such as silicones, polysulphides, polyurethanes, polybutadienes and the like. The preferred fluid composition according to the invention is based on mixtures of poly(propylene glycol) diglycidyl ether and trimethylol propane triglycidyl ether, which can be crosslinked with typical epoxy resin crosslinkers such as diamines, amidoamines or polyamines. The setting time of the fluid can be controlled by the choice of crosslinker and/or by the addition of accelerating or retarding agents. The preferred fluid composition gives a very low viscosity starting material which sets to an elastomeric material with suitable deformability for the expansion. Fillers and weighting agents such as barium sulphate, iron oxide, galena or manganese dioxide can be added to raise the density of the material to a suitable level.

The present invention is particularly suited for operations which require a repeated expansion of the casing shoe, and thus enables the drilling of monodiameter wells.

The invention will now be described, by way of non-limitative example only, with reference to the accompanying drawings.

BRIEF DESCRIPTION OF THE DRAWINGS

FIGS. 2A-2E show steps of a method in accordance with an example of the invention;

FIG. 3A-3B illustrates an example of the invention using a double casing expansion step.

EXAMPLES

Figure 1:
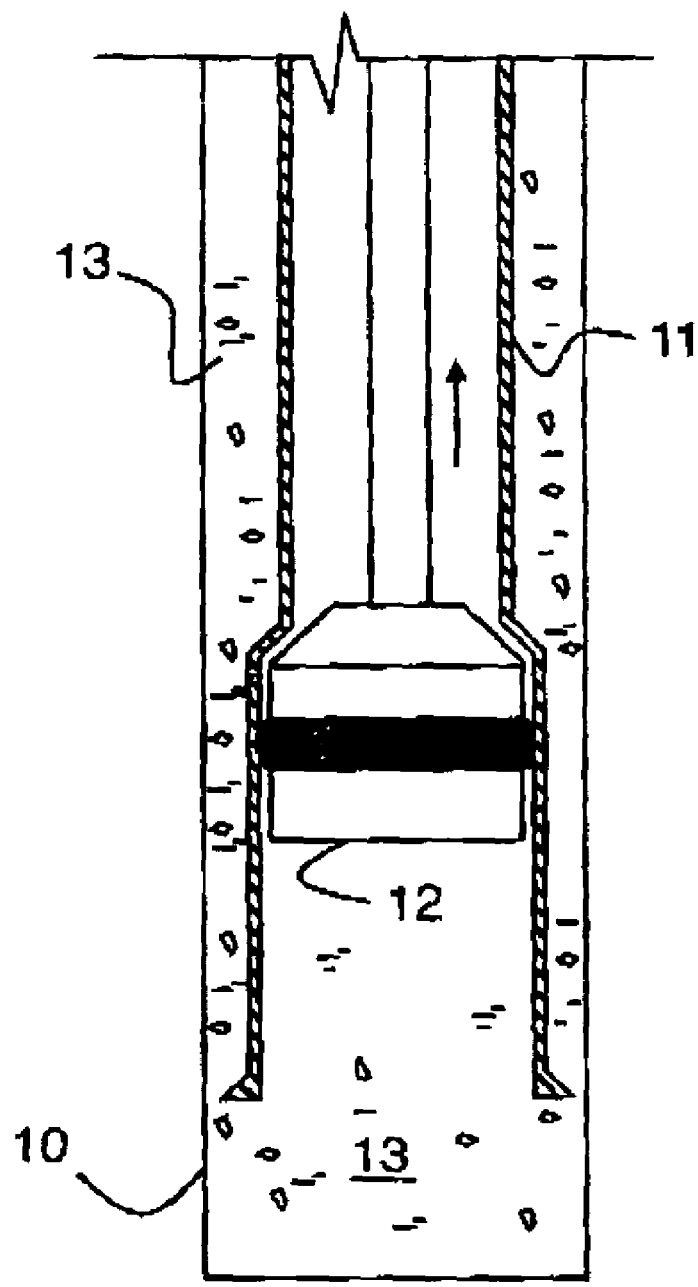
FIG. 1 illustrates the expansion of casing as known.

Before describing an example of the present invention, the basic expandable liner operation as known is illustrated with reference to FIG. 1. There is shown the bottom section 10 of an open borehole. In the open hole a solid expandable liner 11 is run through existing casing or liner, positioned in the open hole 10, then expanded using a mandrel or expansion cone 12 from the bottom up. At the top (not shown) the expansion cone 12 reaches the overlap between the expandable open hole liner 11 and existing pipe string (not shown), the cone expands a special hanger joint to provide a permanent seal between the two strings. The annulus between the borehole 10 and the liner 11 is filled with cement material 13, which after setting is designed to provide a seal between the formation and the liner.

Detailing now steps in accordance with an example of the invention, FIG. 2A shows a drilled hole 20 filled with drilling fluid 231. An expandable tubing (casing) 21 is first lowered into place conventionally. In the next step as shown in FIG. 2B, a cement slurry 232 with an extended thickening time sufficient to allow for the expansion of the tubing to be carried out prior to its setting is then pumped down the tubing 21. The interface between the drilling fluid 231 and the cement 232 is shown as line 234. In FIG. 2C, the cement 232 is followed by a plug 241. Behind the plug 241 a liquid 233 is pumped into the bore hole. The liquid will set into a deformable sealant. The liquid sealant 233 is capped by a conventional bottom plug 242. After placement, the deformable sealant is adapted to set rapidly. The interface of the sealant with the cement is indicated as line 235. After the deformable sealant 233 has set, the expansion of the tubing is carried out.

As already illustrated in FIG. 1, the expansion is carried out using a cone-shaped mandrel 22, which is forced up the tubing 21 from the bottom to the top, expanding it as it travels. The force can be applied to the mandrel 22 either using hydraulic pressure from below or by pulling on the string 221 to which it is attached or by a combination of the two. Other methods known from conventional expandable liner operation may be applied to expand the tubing, such as using a cone pushed from above or using hydraulic pressure.

The setting time of the cement 232 is adjusted such that it sets after the expansion operation is completed. As the deformable sealant 233 is already fully set by this time, the casing shoe 211 at the bottom of the tubing 21 is fully supported. Thus drilling operations to drill the next section of the well 20 can be resumed without having to wait for the cement 232 to set.

Hence, the use of a very long thickening time cement does not increase the wait-on-cement (WOC) time.

As already noted above, because the expansion of the tubing 21 is carried out after placement and setting of the annular sealant 233, the sealant must be much more deformable than a conventional cement. It is normally assumed that, because the volume of the annulus is decreased by the expansion, the material must be compressible. However, a sufficiently deformable material can also accommodate the expansion by stretching axially, in which case its volume is conserved and bulk compressibility is not necessary. Indeed, most deformable sealants and rubbers used in other applications do not have high bulk compressibility, but are stretched in one direction and compressed in an orthogonal direction to provide the necessary stress to respond to dimensional changes and maintain a seal. The method by which expandable tubing are expanded gradually from bottom to top allows for this axial stretching to occur during the process, moving the interface 235 between the cement 232 and the sealant 233 as indicated in FIG. 2E. It can therefore be concluded that compressibility is a preferred property of the sealant material; however sealant materials may be used that compensate for the lack of the compressibility through deformation.

To carry out the process according to the above example of the invention, the sealant fluid is formulated with a density and rheological behavior that allows it to be easily pumped into the well and then to remain stable beneath a column of unset cement. The above sealant fluid has the further property to set as a deformable and/or compressible sealant that can accommodate the expansion of the tubing.

Many liquid elastomer precursors could potentially be used as sealant fluid 233 such as silicones, polysulphides, polyurethanes, polybutadienes and the like. The preferred fluid composition according to the invention is based on mixtures of poly(propylene glycol) diglycidyl ether and trimethylol propane triglycidyl ether, which can be crosslinked with typical epoxy resin crosslinkers such as diamines, amidoamines or polyamines. The setting time of the fluid can be controlled by the choice of crosslinker and/or by the addition of accelerating or retarding agents. The preferred fluid composition gives a very low viscosity starting material which sets to an elastomeric material with suitable deformability for the expansion. Fillers and weighting agents such as barium sulphate, iron oxide, galena or manganese dioxide can be added to raise the density of the material to a suitable level.

If the volume change is to be accommodated by compression of the sealant, then the bulk compressibility of the material can be enhanced by the addition of microspheres or a chemical agent that will introduce gas bubbles into the material at a suitable time during setting such that they become permanently trapped in the set material. The microspheres used are preferably sufficiently strong to not be compressed by hydrostatic pressure prior to setting, but sufficiently weak to be compressible by the expansion process.

The invention is particularly suited to cases in which the tubing is to be expanded up to the same internal diameter as the previous string, thereby resulting in no loss of diameter and potentially allowing a monodiameter well to be constructed. In the example illustrated by FIG. 3, a double expansion of the casing is carried out. The first expansion leaves an upper casing shoe 311 embedded in a set but deformable matrix of sealant material 333 as described above with reference to FIG. 2. After drilling the next section of the well, a second casing 312 is lowered through the upper casing 311 and second injections of cement 332 and sealant fluids (not shown) are placed. The upper interface between the second cement 332 and the sealant 333 of the upper section is indicated by line 335. The mandrel 32 is then forced up to expand the second casing 312. Where the top of the tubing 312 meets the shoe 311 of the original casing, the latter is expanded a second time in order to accommodate the expansion of the new tubing 312. An overlap region with a pressure-tight seal 313 is formed with the sealant 333 as pressure-tight seal 313 between the two casings as shown in FIG. 3B. The deformable matrix of sealant material 333 provides under these circumstances a blockage for all possible pathways for fluid migration along the well bore and between successive strings of casing. By embedding a casing shoe with a deformable sealant, the present invention facilitates the double expansion operation by maintaining the existing seal around the casing shoe and establishing a new seal between the casing shoe and the upper section of the new casing string.

A sample of a flexible, compressible sealant material was made up as follows. To 100 g of poly(propylene glycol) diglycidyl ether, 168.7 g of barium sulfate powder, 53.4 g of stearate-coated calcium carbonate and 11.1 g of hollow silica microspheres were added and mixed well in a Waring blender. 10.9 g of a hardener based on the reaction product of tetraethylene pentamine and tall oil were then added to the mixture and stirred in to make a homogeneous mixture. The rheology of the mixture was measured using a standard Chan 35 rheometer at room temperature (22° C.) and fitted well to a Bingham model with a yield stress of 2.7 Pa and a plastic viscosity of 1.79 Pa s. A sample of the mixture was then poured into a 2.54 cm diameter sealed cylindrical steel cell and heated to 80° C. overnight to cure it.

Figure 4A:
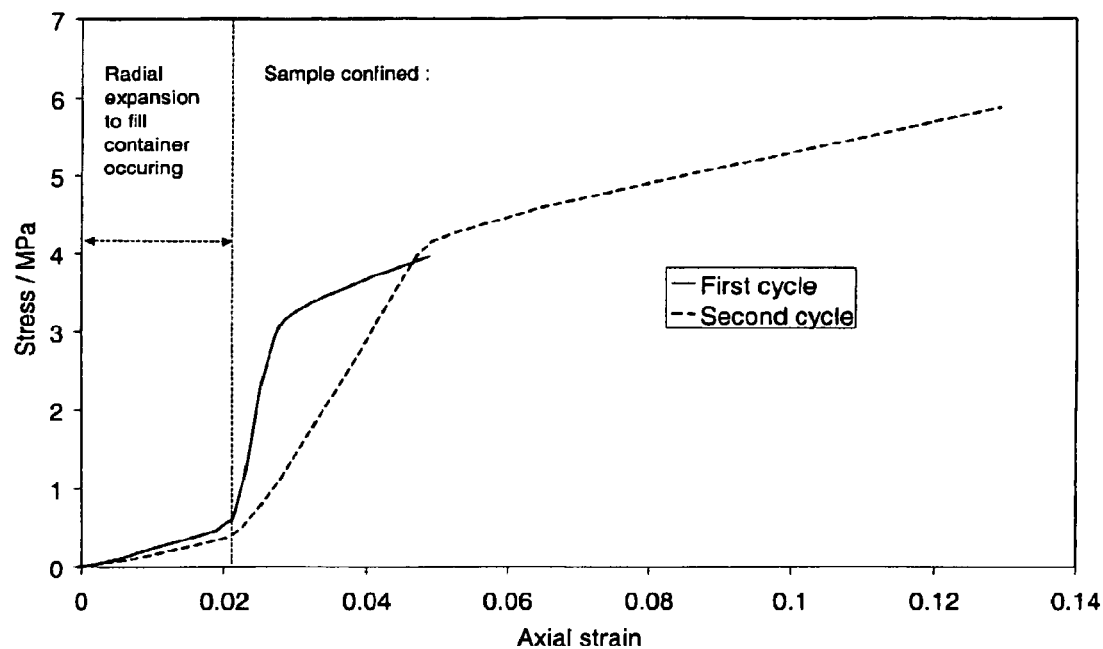
FIGS. 4A, B and C illustrate material properties beneficial for applications in accordance with the invention.

The sample was removed from the cell and its ends were machined flat to enable analysis of its mechanical properties by compression on a conventional load frame. It was put back into the cylindrical steel cell and compressed via a moveable plunger located at the upper end of the cell. Two compression cycles were carried out, which are illustrated in FIG. 4A. Each curve has three distinct sections. The first section has a very small gradient, and this corresponds to the initial compression in which the sample remains free to expand radially. At the end of this section it is in contact with the cylinder walls and is thus confined. The gradient rises substantially and gives a measure of the initial bulk compressibility of the material. In the third section the gradient decreases again as the microspheres begin to break.

In the first cycle of compression, the axial stress on the sample was increased from zero to 4 MPa at a constant strain rate of 0.013 min$^{-1}$. The stress vs. strain curve was recorded, and the strain was then released. In the second cycle of compression the stress was raised from zero to 6 MPa at the same strain rate. From FIG. 4A it can be seen that the sample returned to its original size after the first compression cycle, and that during subsequent compression the stress increased linearly from the point at which the sample became confined to the maximum stress obtained in the first cycle. This point occurred at the same strain as previously, and as the stress was increased further the crushing of the microspheres was resumed at the same rate as before. These data indicate the reversibility of the sample compressibility after the spheres have been crushed.

Figure 4B:
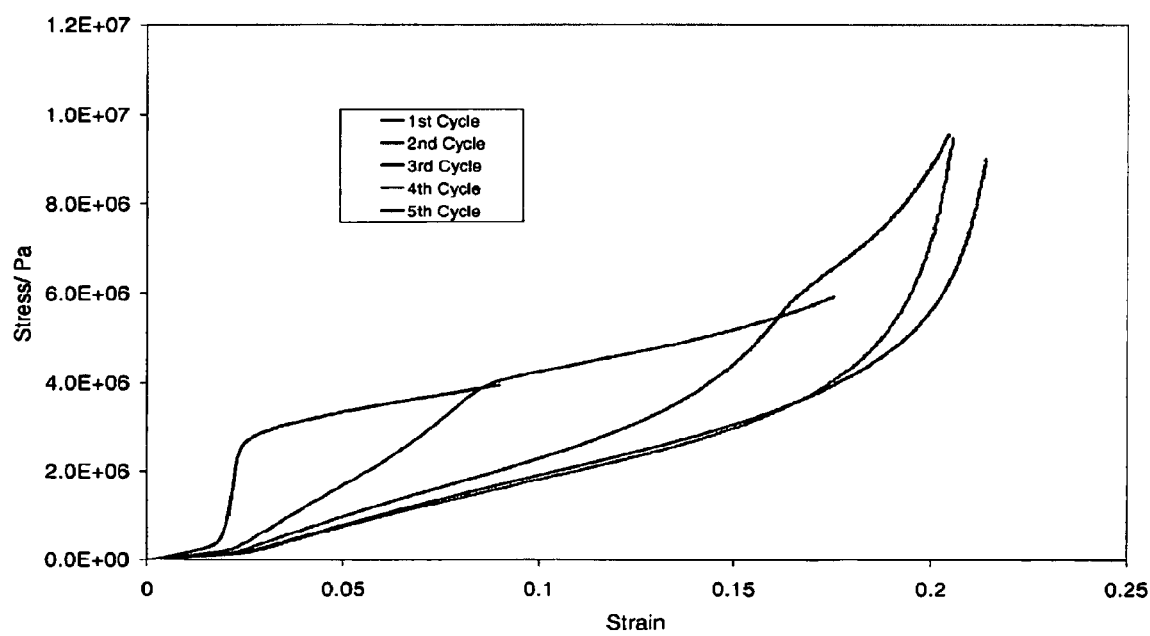

The results of a series of five compression cycles (shown from left to right) leading to a complete crushing of the microspheres is shown in FIG. 4B. Using a similar sample as in the previous example composed of 90 g of poly(propylene glycol) diglycidyl ether, 9.8 g hollow silica microspheres, 106 g of barium sulphate powder, 26 g of stearate-coated calcium carbonate and 25 g of the same hardener. Starting with the third cycles the axial was increased to 10 MPa. During the third cycle the stress/strain curve crosses that of the second cycle at approximately the same point reached at the end of the second cycle, although it would appear from the curve that by this point the majority of the microspheres have been crushed. The fourth and fifth cycles overlap each other closely and show two regions—an initial one of high compressibility and a later one of low compressibility. It is assumed that the onset of low compressibility occurs when all of the voidage created by the microspheres has been closed up by the compression. These curves superimpose quite closely and indicate that at this stage all of the microspheres have been crushed and that the material has become reversibly compressible.

A further sample of a flexible, compressible sealant material was made up by the method of the first example described above but replacing the crushable microspheres with flexible microspheres. The sample contained 90 g of poly(propylene glycol) diglycidyl ether, 2.35 g of hollow flexible polymer microspheres, 106 g of barium sulphate powder, 26 g of stearate-coated calcium carbonate and 25 g of the same hardener used in the above example.

The mean particle size of the flexible microspheres was 60 microns and their effective density was 0.03 g cm$^{-3}$. The rheology of the mixture at 23° C. fitted well to a Bingham model with a yield stress of 3 Pa and a plastic viscosity of 1.05 Pa s. After curing at 80° C., the sample density was measured to be 1.11 g cm$^{-3}$, as expected by calculation from the densities of the components of the mixture.

Figure 4C:
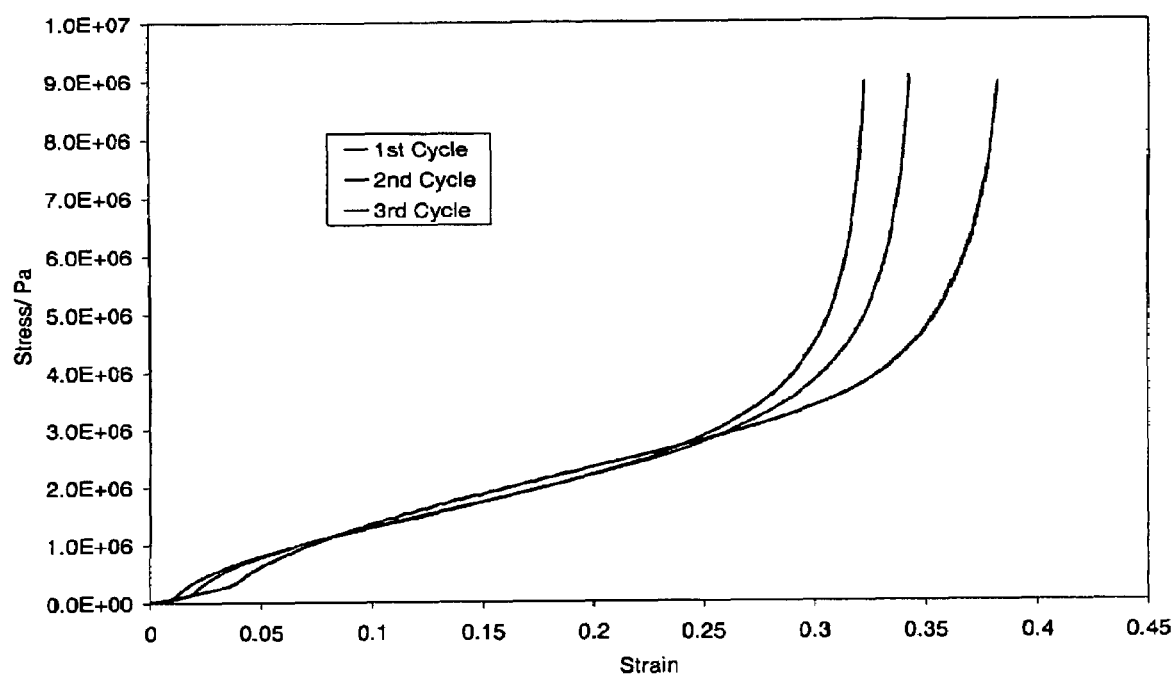

The sample was subjected to a similar compression analysis as that described in the previous example, but for this sample three compression cycles were used, which are illustrated in FIG. 4C. In all three compression cycles the axial stress was increased from zero to 10 MPa at a strain rate of 0.013 min$^{-1}$ as before. All curves show two regions of high and low compressibility. Because the microspheres are made from a polymer with similar flexibility to the surrounding elastomeric network, the observed behavior is similar to that of the material in the previous example after the spheres had all been crushed.

This material could therefore be used to seal expandable tubing at shallow depths where the hydrostatic pressure during placement would not be sufficient to collapse the microspheres completely.

The invention claimed is:

1. A method of lining a wellbore using expandable tubing and a low viscosity sealant composition, comprising the steps of
    lowering an expandable tubing into said wellbore;
    injecting a cement composition into said wellbore;
    injecting the low viscosity sealant composition into said wellbore, wherein a setting time of the cement composition is longer than the setting time of the sealant composition;
    letting said sealant composition solidify into a deformable matrix embedding at least a bottom section of said tubing within said wellbore; and
    expanding said tubing.

2. The method of claim 1, wherein the sealant composition is deformed or compressed by the expansion of the tubing.

3. The method of claim 2, wherein the sealant composition is stretched in direction of the wellbore by the expansion of the tubing.

4. The method of claim 1, wherein the tubing is expanded prior to setting of the cement composition.

5. Method according to claim 1, wherein the sealant composition comprises poly(propylene oxide) diglycidyl ether and a crosslinking agent.

6. Method according to claim 1, wherein the sealant composition comprises trimethylol propane triglycidyl ether and a crosslinking agent.

7. Method according to claim 1, wherein the sealant composition comprises crosslinkable silicone polymers.

8. Method according to claim 1, wherein the sealant composition is made compressible by the addition of microspheres or a gas-generating blowing agent.

9. Method according to claim 1, wherein the sealant composition comprises poly(propylene oxide) diglycidyl ether and crosslinker, and wherein the sealant composition has a viscosity providing for injection of the sealant into said wellbore prior to solidifying.

10. Method according to claim 9, wherein the sealant composition further comprises microspheres or a gas-generating blowing agent.

11. Method according to claim 1, wherein the sealant composition comprises trimethylol propane triglycidyl ether and crosslinker, and wherein the sealant composition has a viscosity providing for injection of the sealant into said wellbore prior to solidifying.

12. The sealant composition according to claim 11, wherein the sealant composition further comprises microspheres or a gas-generating blowing agent.

* * * * *